(No Model.) 2 Sheets—Sheet 2.

A. W. LENNIER.
FIRE ESCAPE.

No. 411,106. Patented Sept. 17, 1889.

Witnesses:
S. R. Seibert
Robt J. Thomas

Inventor:
Alexander W. Lennier
By Taylor & Layn
Atty

UNITED STATES PATENT OFFICE.

ALEXANDER WILLIAM LENNIER, OF JAMESTOWN, NEW YORK.

FIRE-ESCAPE.

SPECIFICATION forming part of Letters Patent No. 411,106, dated September 17, 1889.

Application filed June 22, 1889. Serial No. 315,272. (No model.)

*To all whom it may concern:*

Be it known that I, ALEXANDER WILLIAM LENNIER, a citizen of the United States of America, residing at Jamestown, in the county of Chautauqua and State of New York, have invented certain new and useful Improvements in Fire-Escapes, of which the following is a specification, reference being had therein to the accompanying drawings.

My invention relates to improvements in that class of fire-escapes known as "lazy-tongs;" and the objects of my invention are, first, to increase the stability of the tongs, and, second, to facilitate the raising and lowering of the same, my said invention consisting in the improved construction and combination of parts, as hereinafter fully described and claimed.

Figure 1:
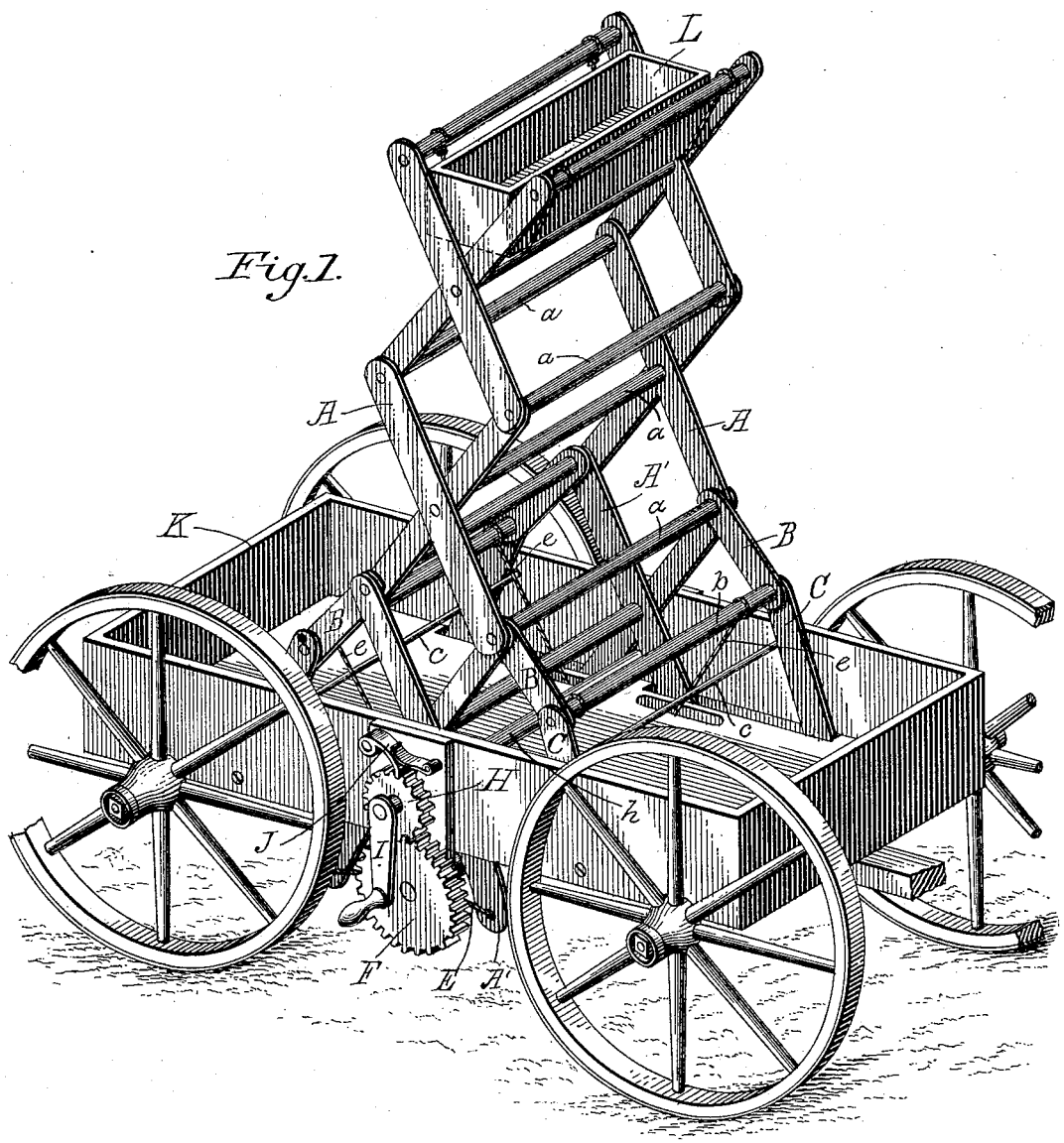
Figure 2:
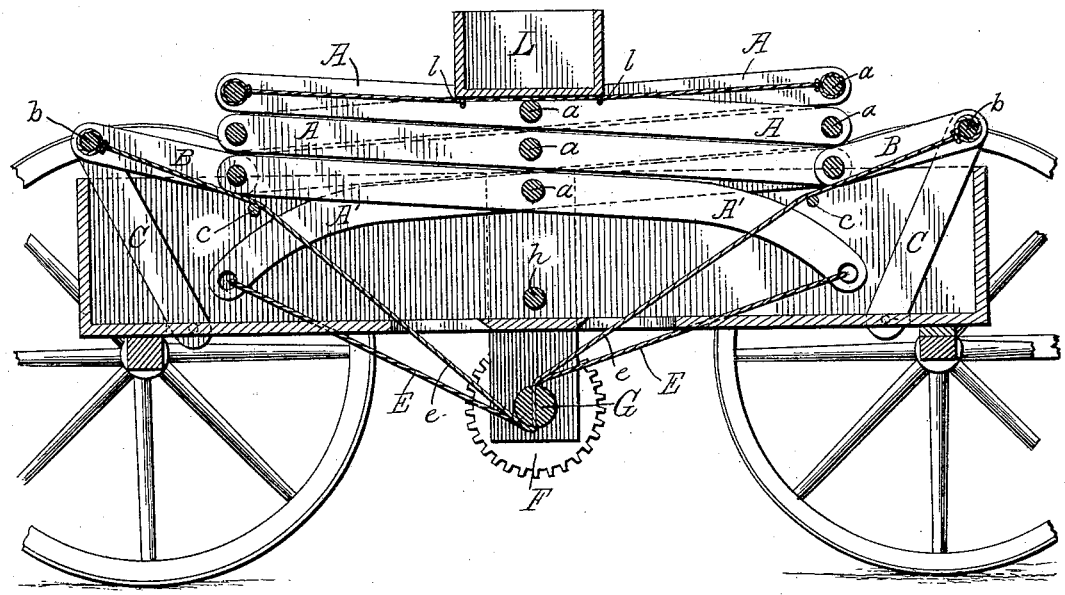

In the accompanying drawings, Figure 1 is a perspective view, and Fig. 2 a sectional view.

Similar letters refer to similar parts throughout both views.

A represents two series of levers forming lazy-tongs, connected at their corresponding pivotal points by the rods $a$. The lowermost levers A' are pivoted at their fulcrums to the sides of the supporting-frame K, and to their lower ends are attached wire ropes E, passing through transverse holes in the winding-drum G, as shown in Fig. 2.

To the supporting-frame K are pivoted the bars C, connected with the lazy-tongs by the links B, forming toggle-jointed braces, whereby the tongs are strengthened and supported. The braces on one side are connected with those opposite by the rods $b$, to which are attached wire ropes $e$, passing through transverse holes in the winding-drum G. In front of the braces are rods $c$, passing from one side of the frame to the other, to prevent the braces from falling forward when the tongs are lowered.

On the outer ends of the drum-shaft are mounted spur-wheels F, meshing with pinions H, mounted upon the shaft $h$, having crank-handles I. Pawls J engage with the pinions H, to prevent backward motion while the tongs are being raised and to hold the same when the desired elevation is reached. If desired, this gearing may be applied only at one end of the drum-shaft.

The carriage L is swung between the upper ends of the tongs by means of wire ropes fastened to the rods $a$ and passing through rings $l$ under the carriage, as shown in Fig. 2.

The apparatus is to be mounted upon wheels, so as to be easily transported.

It will be seen that when the drum is revolved, winding the ropes upon it, the lower arms of the levers A' will be drawn toward each other, and the rods $b$ will be drawn toward the drum, straightening the braces B C and closing the upper arms of the levers A', thus elevating the lazy-tongs. The braces will thus aid in raising the tongs and support the same at any elevation; and if the ropes E should break during the elevating, the tongs could still be elevated or lowered by means of the ropes $e$.

I am aware that lazy-tongs fire-escapes are not new, and I therefore do not claim this broadly; but What I do claim, and desire to secure by Letters Patent, is—

1. In a fire-escape, the combination, with the supporting-frame K, lazy-tongs A, and rods $a$, of the braces B C, rods $b$, rods $c$, drum G, spur-wheels F, pinions H, crank-handles I, pawls J, and carriage L, substantially as and for the purposes specified.

2. In a fire-escape, the combination, with the supporting-frame K, lazy-tongs A, rods $a$, ropes E, and drum G, of the braces B C, rods $b$, rods $c$, and ropes $e$, as and for the purposes described.

3. In a fire-escape, the combination, with the supporting-frame K, lazy-tongs A, and rods $a$, of the toggle-jointed braces B C, and rods $b$ and $c$, as and for the purposes described.

In testimony whereof I affix my signature in presence of two witnesses.

ALEXANDER WILLIAM LENNIER.

Witnesses:
PETER ROUSSEAU,
ALFRED L. FURLOW.